US012585809B2

(12) United States Patent
Huang et al.

(10) Patent No.: US 12,585,809 B2
(45) Date of Patent: Mar. 24, 2026

(54) PRIVACY-PRESERVING DATA PROCESSING FOR CONTENT DISTRIBUTION

(71) Applicant: Google LLC, Mountain View, CA (US)

(72) Inventors: Wei Huang, Mountain View, CA (US); Zhenyu Liu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 166 days.

(21) Appl. No.: 18/574,715

(22) PCT Filed: Apr. 24, 2023

(86) PCT No.: PCT/US2023/019580
§ 371 (c)(1),
(2) Date: Dec. 27, 2023

(87) PCT Pub. No.: WO2024/226025
PCT Pub. Date: Oct. 31, 2024

(65) Prior Publication Data
US 2025/0086300 A1     Mar. 13, 2025

(51) Int. Cl.
*G06F 21/62*          (2013.01)

(52) U.S. Cl.
CPC ................................. *G06F 21/6218* (2013.01)

(58) Field of Classification Search
CPC ...... G06F 21/60; G06F 21/62; G06F 21/6209; G06F 21/6218
USPC ...................................................... 726/26–30
See application file for complete search history.

(56) References Cited

U.S. PATENT DOCUMENTS

| | | | | |
|---|---|---|---|---|
| 10,762,895 | B2 * | 9/2020 | Togwe .................... | G10L 15/26 |
| 11,593,510 | B1 | 2/2023 | Knox et al. | |
| 12,160,481 | B2 * | 12/2024 | Wu ......................... | G06F 9/451 |
| 2009/0247193 | A1 | 10/2009 | Kalavade | |
| 2017/0116552 | A1 * | 4/2017 | Deodhar ............ | G06Q 10/0639 |

(Continued)

FOREIGN PATENT DOCUMENTS

| | | |
|---|---|---|
| EP | 1869870 | 12/2007 |
| JP | 2008-535079 | 8/2008 |

OTHER PUBLICATIONS

Developer.google.com [online], "Shared storage" Apr. 25, 2022, retrieved on Mar. 28, 2024, retrieved from URL<https://developers.google.com/privacy-sandbox/relevance/shared-storage>, 7 pages.

(Continued)

*Primary Examiner* — Bharat Barot
(74) *Attorney, Agent, or Firm* — Fish & Richardson P.C.

(57) ABSTRACT

Methods, systems, and apparatus, including computer programs encoded on a computer storage medium, for distributing digital contents to client devices are described. For each of a plurality of client devices, the system receives a digital component request, identifies one or more user attributes of a user based on the digital component request, and sends the identified user attributes to the client device. The system obtains, from a shared storage of each client device, accumulated user attribute data and generates an aggregated user attribute report for a set of aggregation keys using the obtained accumulated user attribute data. The system distributes digital components to the client devices based on distribution parameters adjusted based on the aggregated user attribute report.

20 Claims, 4 Drawing Sheets

(56) References Cited

U.S. PATENT DOCUMENTS

| | | | |
|---|---|---|---|
| 2020/0257741 A1* | 8/2020 | Breaux | G06F 16/951 |
| 2022/0019689 A1 | 1/2022 | Lau et al. | |
| 2022/0180389 A1 | 6/2022 | Yates | |
| 2022/0405407 A1* | 12/2022 | Bai | G06F 21/6245 |

OTHER PUBLICATIONS

Developer.google.com [online], "Private aggregation API" Oct. 11, 2022, retrieved on Mar. 28, 2024, retrieved from URL<https://developers.google.com/privacy-sandbox/relevance/private-aggregation>, 10 pages.

Github.com [online], "Aggregated reporting API," 2020, retrieved on Mar. 29, 2024, retrieved from URL<https://github.com/csharrison/aggregate-reporting-api>, 6 pages.

International Search Report and Written Opinion in International Appln. No. PCT/US2023/019580, mailed on Nov. 20, 2023, 13 pages.

Saunderson et al., "Semidefinite descriptions of the convex hull of rotation matrices," SIAM Journal on Optimization, 2015, 25(3):1314-43.

Office Action in Japanese Appln. No. 2024-535285, mailed on Aug. 5, 2025, 4 pages (with English translation).

Notice of Allowance in Japanese Appln. No. 2024-535285, mailed on Oct. 14, 2025, 5 pages (with English translation).

* cited by examiner

300

Receive digital component requests from client devices
310

Identify user attributes
320

Send digital component response to the client device
330

Obtain accumulated user attribute data from the shared storage of the client device
340

Generate aggregated user attribute report
350

Adjust distribution parameters
360

Distribute digital components
370

PRIVACY-PRESERVING DATA PROCESSING FOR CONTENT DISTRIBUTION

CROSS-REFERENCE TO RELATED APPLICATIONS

This application is a U.S. National Stage application under 35 U.S.C. § 371 and claims the benefit of priority to International Application No. PCT/US2023/019580, having an International Filing date of 24 Apr. 2023, the contents of which are hereby incorporated by reference.

TECHNICAL FIELD

This specification is generally related to data processing, data privacy, and data security.

BACKGROUND

Data security and user privacy are vital in systems and devices connected to public networks, such as the Internet. The enhancement of user privacy has led many developers to change the ways in which user data is handled. For example, some browsers are planning to deprecate the use of third-party cookies.

SUMMARY

This specification describes methods, computer systems, and apparatus, including computer programs encoded on computer storage media, for generating and processing non-identifying user data to select and provide digital content to client devices in a privacy-preserving manner.

In one innovative aspect, this specification describes a method for distributing digital components to client devices. The method can be implemented by a system including one or more computers.

For each of a plurality of client devices, the system receives a digital component request from an application running on the client device of a user. The system identifies, based on the digital component request, one or more user attributes of the user. The system sends, to the application, a digital component response including (i) one or more digital components and (ii) attribute data comprising the one or more user attributes of the user, wherein the application is configured to update, based on the one or more user attributes, accumulated user attribute data stored in a shared storage of the client device in response to receiving the attribute data. The system obtains, from the shared storage of each of the plurality of client devices, the accumulated user attribute data stored in the shared storage of each client device. The system generates an aggregated user attribute report for one or more aggregation keys using the obtained accumulated user attribute data, including, for each of the one or more aggregation keys, obtaining an aggregated data profile that is generated by aggregating the accumulated user attribute data from a subset of the client devices that have accessed an electronic resource or a digital component identified by the aggregation key. The system adjusts, based on the aggregated data profiles, one or more distribution parameters for distributing digital components to client devices in response to digital component requests. The system distributes digital components to the client devices based on the distribution parameters. Other implementations of this aspect include corresponding apparatus, systems, and computer programs, configured to perform the aspects of the methods, encoded on computer storage devices.

These and other implementations can each optionally include one or more of the following features. In some implementations, to generate the aggregated user attribute report, the system sends, to a secure aggregation system, an aggregation request including the accumulated user attribute data obtained from each of the client devices and the one or more aggregation keys, and receives, from the secure aggregation system, the aggregated data profile generated in response to the aggregation request. The accumulated user attribute data received from each client device can be encrypted by the client device using an encryption key of the secure aggregation system.

In some implementations, the digital component request includes contextual data related to an environment in which the one or more digital components will be displayed at the client device. The environment can include an electronic resource and the contextual data can include a resource locator for an electronic resource in which the one or more digital components will be displayed at the client device, and/or topics of content of the electronic resource.

In some implementations, the one or more user attributes are identified using a predictive model configured to predict attributes of users that have accessed the electronic resource or the topics of the contents of the electronic resource. The application can be configured to: in response to receiving the user attributes identified using the predictive model, determine whether the accumulated user attribute data stored in the shared storage of the client device includes a keyed entry for the one or more user attributes; in response to the accumulated user attribute data not including the keyed entry, generate a new keyed entry in the accumulated user attribute data, and assign an entry value for the new keyed entry based on the one or more user attributes identified using the predictive model; and in response to the accumulated user attribute data including the keyed entry, update a current entry value of the keyed entry in the accumulated user attribute data based on the one or more user attributes identified using the predictive model. To update the current entry value of the keyed entry, the application can be configured to increment or decrement the current entry value of the keyed entry in response to the accumulated user attribute data including the keyed entry.

In some implementations, the user is subscribed to the electronic resource with a user identifier, and the one or more user attributes are identified using a user profile associated with the user identifier. The application can be configured to: in response to receiving the user attributes identified using the user profile, determine whether the accumulated user attribute data stored in the shared storage of the client device includes a keyed entry for the one or more user attributes; in response to the aggregated user attribute data not including the keyed entry, generate a new keyed entry in the accumulated user attribute data, and assign an entry value for the new keyed entry based on the one or more user attributes identified using the user profile; and in response to the accumulated user attribute data including the keyed entry, update the entry value of the keyed entry in the accumulated user attribute data based on the one or more user attributes identified using the user profile. A user interface of the electronic resource can include a code to cause the application to update the accumulated user attribute data based on the one or more user attributes in response to receiving the user attributes.

In some implementations, the aggregated profile for an aggregation key includes one or more metrics for the electronic resource or the digital component identified by the aggregation key. The one or more metrics can include a reach metric measuring a number of unique users in the subset of client devices that have accessed the electronic resource or the digital component identified by the aggregation key.

In some implementations, to aggregate the user attribute data from the subset of client devices, the system adds a random noise to the user attribute data of each of the subset of client devices before aggregating.

Particular embodiments of the subject matter described in this specification can be implemented so as to realize one or more of the following advantages. A content distribution system can leverage user attribute data of a set of users, e.g., users that have accessed a particular electronic resource (e.g., website) or a digital component (e.g., a video/audio clip, image, or text) to guide the selection and distribution of content to other users, e.g., to distribute content that best fit the interests or needs of the users.

Historically, third-party cookies (e.g., cookies from a different domain than the resource being rendered by a client device) have been used to collect data from client devices across the Internet. For example, a third-party cookie can be a script file from a website other than the one the client device is currently visiting, typically for the purpose of tracking user behavior and/or serving digital content to the user. Due to the increasing concerns over user privacy and data protection, some browsers and device platforms block the use of third-party cookies and third-party cookies are increasingly being removed from use, thereby preventing the collection of data using third-party cookies. This creates a challenge when attempting to utilize collected data to enhance online browsing experiences, e.g., by selecting content relevant to users based on the data collected using third-party cookies. In other words, without the use of third-party cookies, much of the data previously collected is no longer available, which prevents computing systems from being able to use that data to predict interests or attributes of users based on activities performed by the users at particular web pages or other resources, to enhance the online experience for users, and/or to present relevant content to users.

The techniques described herein can solve hurdles that may arise from the eradication of third-party cookies. In particular, this specification describes techniques for obtaining privacy-preserving user attribute data from a shared storage of client devices. The shared storage of a client device maintains accumulated user attribute data characterizing attributes and/or interests of a user of the client device, and updates the accumulated user attribute data based on user attribute signals received from a content distribution system or a content-providing system. A computer system, e.g., a secure server, can collect the accumulative user attribute data from the client device without using third-party cookies. The computer system can generate an aggregated user attribute report from the user attribute data, and the content distribution system can use the aggregated user attribute report to guide the distribution of digital components.

By using these techniques, the content distribution system can effectively leverage user attribute data of a group of users to guide the selection and distribution of content to particular users without using third-party cookies. Instead of using third-party cookies, the described techniques for maintaining and utilizing privacy-preserving user attribute data using a shared storage of client devices. The shared storage provides a framework that enable sharing data across multiple sessions and/or multiple instances of accessing an electronic resource, e.g., a website, and/or sharing data across different electronic resources. The shared storage can also be implemented with measures to protect the security and privacy of the stored data. These techniques also provide user privacy protection for the process of collecting the user attribute data by preventing collecting and using sensitive information (e.g., personally identifiable information) of the user without the user's consent.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this specification describes systems and techniques for providing digital content, e.g., digital components, to client devices in ways that protect user privacy. A server can be configured to obtain accumulated user attribute data from client devices and generate an aggregated user attribute report using the obtained user attribute data. A digital component distribution system can use the aggregated user attribute report to adjust distribution parameters for distributing digital components to client devices in response to digital component requests.

Further to the descriptions throughout this document, a user may be provided with controls (e.g., user interface elements with which a user can interact) allowing the user to make an election as to both if and when systems, programs, or features described herein may enable the collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 1:
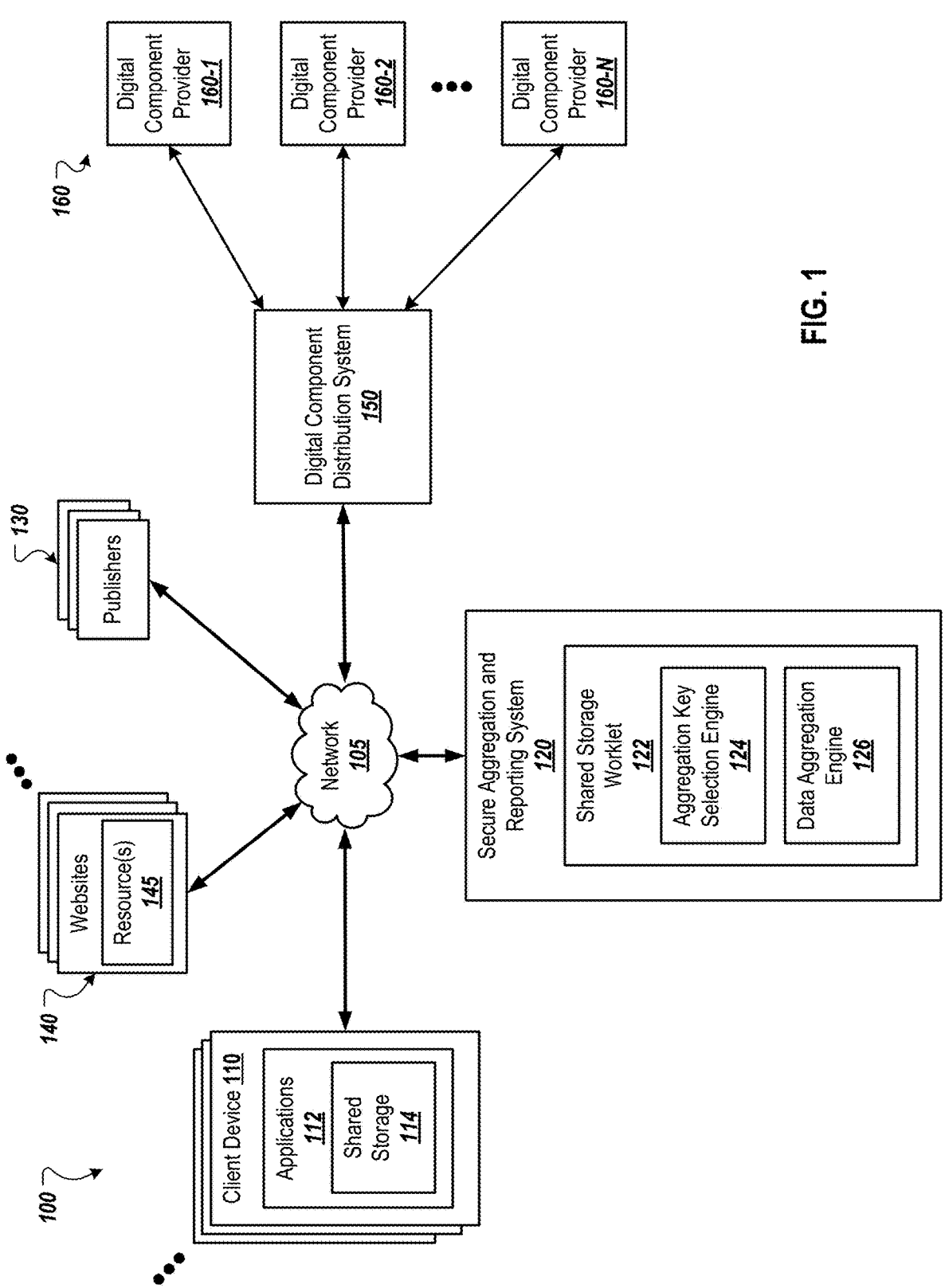
FIG. 1 is a block diagram of an example environment in which a digital component distribution system distributes digital components to client devices.

FIG. 1 is a block diagram of an example environment 100 in which a digital component distribution system 150 distributes digital components to client devices 110. The environment 100 includes a data communication network 105, such as a local area network (LAN), a wide area network (WAN), the Internet, a mobile network, or a combination thereof. The data communication network 105 connects client devices 110 to the digital component distribution system 150. The network 105 can also connect the digital component distribution system 150 digital component providers, e.g., 160-1, 160-2, and 160-3.

A website 140 is one or more electronic resources associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

An electronic resource is also referred to herein as a resource for brevity. In this specification, resources can include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). A resource can be identified by a resource address, e.g., a Universal Resource Locator (URL) that is associated with the resource.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., a watch or a pair of glasses), a smart phone, a speaker device, a tablet device, or another hardware device. A client device can also include a digital media device, e.g., a streaming device that plugs into a television or other display to stream videos to the television, a gaming device, or a virtual reality system.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

As used throughout this specification, the "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement the content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request that requests a digital component for display in the digital component slot. In some implementations, the digital component slot and/or the resource can include code (e.g., scripts) that cause the application 112 to request a digital component from the digital component distribution system 150.

A digital component request can include contextual data, which is generally considered non-sensitive. The contextual data can describe the environment in which a selected digital component will be presented. The contextual data can include, for example, coarse location information indicating a general location of the client device 110 that sent the digital component request, a resource (e.g., website or native application) with which the selected digital component will be presented (e.g., by including a resource locator such as a URI or URL for the resource), a spoken language setting of the application 112 or client device 110, the number of digital component slots in which digital components will be presented with the resource, the types of digital component slots, and/or other appropriate contextual information.

As described in more detail below, the digital component distribution system 150 can identify, e.g., predict, user attributes of the user of the client device 110 from which a digital component request is received based on data (e.g., contextual data) included in the digital component request. In response to the digital component response, the digital component distribution system 150 can send attribute data specifying the user attributes identified from the digital component request to the client device 110.

The application 112 maintains a shared storage 114 that stores a set of data that can be accessed and updated by the application 112. The data stored in the shared storage 114 can have any appropriate data formats according to specific applications, preferences, and/or or protocols. The data stored in the shared storage 114 can be shared across multiple sessions and/or multiple instances of the application 112. For example, the stored data can be shared by all instances of an electronic resource (e.g., a website) running in different tabs or windows of the application 112. In some implementations, the data stored in the in the shared storage 114 can be shared across multiple electronic resources, e.g., multiple websites that have been accessed by the application.

Several measures can be taken to protect the security and privacy of the data stored in the shared storage 114. For example, in some implementations, the shared storage 114 can be in a separate portion of the storage space of the application 112. In some implementations, a separate thread of the application 112 manages and provides access to the shared storage 114. The separate thread can isolate the shared storage 114 from being accessed by other components of the application 112, and/or being accessed by unauthorized websites, e.g., websites that the user has not interacted with. In some implementations, the application can encrypt the data stored in the shared storage 114 before transmitting the data to another system over the network 105.

To provide data in guiding the selection and distribution of contents to users, the data stored in the shared storage 114 can include accumulated user attribute data characterizing a user of the client device 110. The accumulated user attribute data can include data characterizing the interests of the user (e.g., topics of interest or hobbies) and/or data characterizing non-identifying demographic attributes of the user. As described in more detail below, the application 112, e.g., the separate thread of the application 112, is configured to update the accumulated user attribute data based on attribute data received from the digital component distribution system 150.

The secure aggregation and reporting system 120 is configured to receive the accumulated user attribute data from the shared storage 114 of multiple client devices 110, and use the accumulated user attribute data to generate an aggregated user attribute report for a set of aggregation keys. The system 120 can be a secure server implemented using one or more computers (or other appropriate computing devices), that may be distributed across multiple locations. The secure system 120 can be operated and maintained by the digital component distribution system 150 or an independent trusted party, e.g., a party that is different from the users of the client devices, the parties that operate the digital component distribution system 150, and the digital component providers 160. For example, the secure system 120 can be operated by an industry group or a governmental group.

In some implementations, the secure system 120 implements a secure environment, i.e., the shared storage worklet 122, configured to access the shared storage 114 of the client devices 110 to receive the accumulated user attribute data, and process the accumulated user attribute data to generate the aggregated report. To provide additional security and privacy protection of user data, the shared storage worklet 122 can be a dedicated process or thread running on the secure system 120 that is separated from the other processes or threads of the secure system 120.

The shared storage worklet 122 includes an aggregation key selection engine 124 and a data aggregation engine 126. The aggregation key selection engine 124 is configured to select an aggregation key from a list of aggregation keys, and the data aggregation engine 126 is configured to generate an aggregated data profile by aggregating the accumulated user attribute data from a subset of the plurality of client devices that have accessed an electronic resource or a digital component identified by the aggregation key.

The digital component distribution system 150 can identify a set of digital components that are eligible to be presented to the client device 110 from among a corpus of digital components that are available from the content platform 150. For example, the digital component distribution system 150 can select one or more digital components from digital components stored in a digital component repository and/or a set of digital components received from digital component providers 160.

The digital component repository can store digital components received from the digital component providers and additional data (e.g., metadata) for each digital component in a database. The metadata for a digital component can include, for example, distribution criteria that define the situations in which the digital component is eligible to be provided to a client device 110 in response to a digital component request received from the client device 110 and/or a selection parameter that indicates an amount that will be provided to the publisher if the digital component is displayed with a resource of the publisher and/or interacted with by a user when presented. The distribution criteria and the selection parameter can be characterized by one or more distribution parameters.

For example, the distribution parameters for a particular digital component can include distribution keywords that must be matched, e.g., by terms specified in the request, in order for the digital component to be eligible for presentation. In another example, the distribution criteria for a digital component can include location information indicating which geographic locations that digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible (e.g., with particular resources or in particular locations). The distribution parameters can also specify a selection parameter and/or budget for distributing the particular third-party content.

As described in more detail below, the distribution parameters for a digital component can be adjusted based on the aggregated user attribute report for the digital component. The digital component distribution system 150 can identify eligible digital components based on the distribution parameters and data included in the digital component request. The digital component distribution system 150 can then select a digital component from the eligible digital components and provide the selected digital component to the client device 110 for display to the user of the client device 110.

Figure 2:
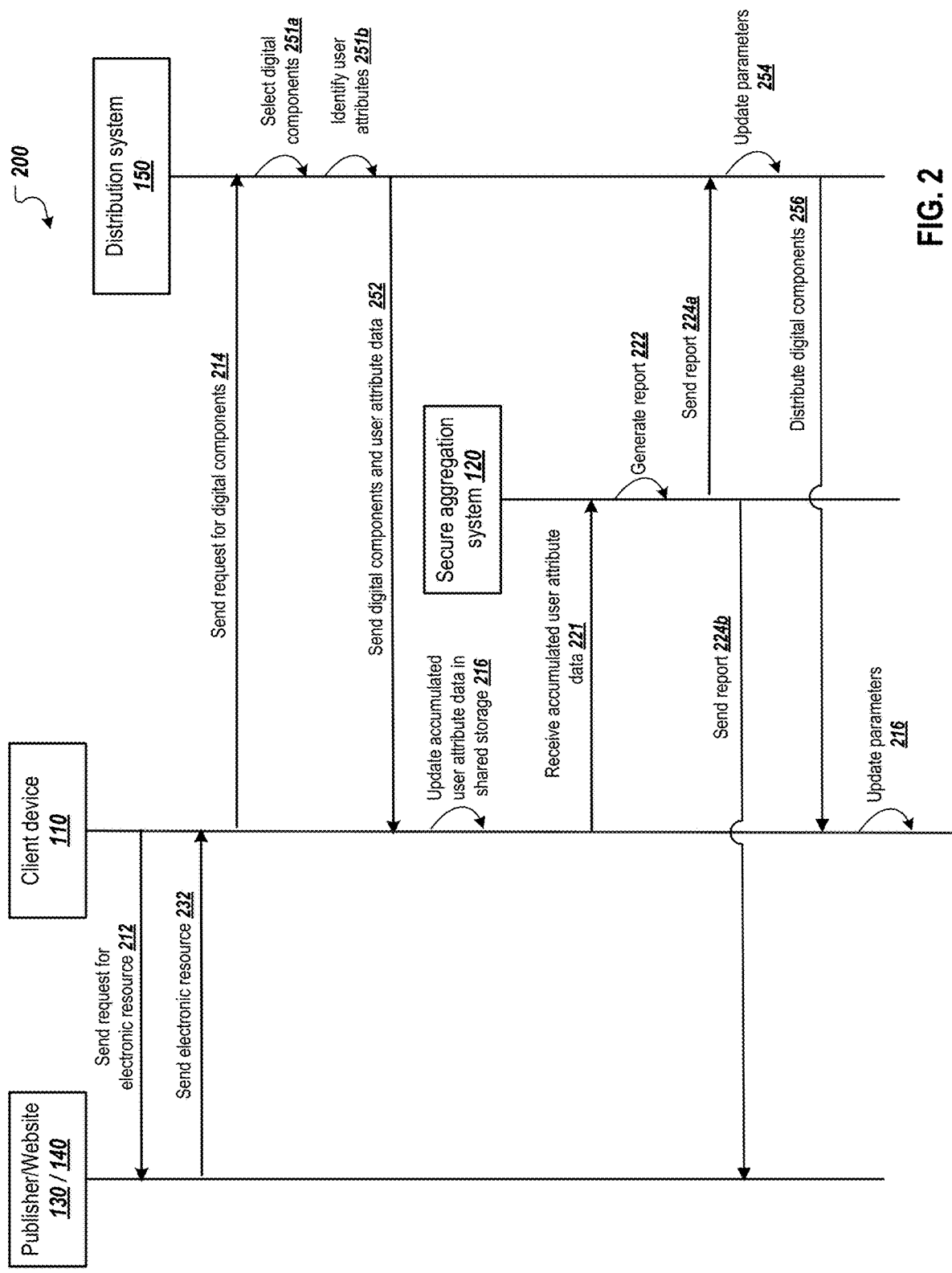
FIG. 2 is a swim lane diagram of an example process for distributing digital components for display at client devices.

FIG. 2 is a swim lane flow diagram of an example process 200 for distributing digital components for display at client devices. Operations of the process 200 can be implemented, for example, by a client device 110, a secure aggregation and reporting system 120, and a digital component distribution system 150, one or more publishers 130, and one or more websites 140. Operations of the process 200 can also be implemented as instructions stored on computer-readable media, which may be non-transitory, and execution of the instructions by data processing apparatus can cause the data processing apparatus to perform the operations of the process 200.

At 212, the client device 110 sends a request for an electronic resource, e.g., a request for a webpage to the website 140. The request can include the URL of the electronic resource. At 232, the website 140 sends the requested electronic resource to the client device 110.

After receiving the requested electronic resource and while loading the electronic resource, the client device 110 generates a digital component request that requests a digital component for display in a digital component slot of the electronic resource. The digital component request includes contextual data that describes the environment in which a selected digital component will be presented. For example, the contextual data can identify the electronic resource (e.g., the website) with which the selected digital component will be presented. In a particular example, the contextual data can include the URL or URI of the electronic resource. The contextual data can include, for example, coarse location information indicating a general location of the client device 110, a spoken language setting of the client device 110, the number of digital component slots in which digital components will be presented with the resource, the types of digital component slots, and/or other appropriate contextual information.

At 214, the client device 110 sends the digital component request to the digital component distribution system 150. The digital component distribution system 150 selects digital components based on the digital component request at 251*a*, and identifies one or more user attributes of the user based on the digital component request at 251*b*.

In some implementations, the digital component distribution system 150 identifies the user attributes using a predictive model (e.g., a trained machine learning model) based on the contextual data in the digital component request. For example, the predictive model can be configured to predict attributes of users that have accessed the electronic resource or the topics of the contents of the electronic resource. The digital component distribution system 150 can use the predictive model to process an input specifying the electronic resource and/or the topics of the contents of the electronic resource, and generate an output that includes a prediction of user attributes of the user, e.g., user interests (e.g., topics of interest) of the user, demographic attributes of the user, and/or other characteristics of a user that has accessed the electronic resource or the topics of the contents of the electronic resource. The user attributes and/or other characteristics predicted by the predictive model can be used to indicate attributes of the user of the client device 110. In some implementations, the predicted model can further output a numerical value for a likelihood that the user has the predicted user attribute.

In some other implementations, when the user is signed in to the electronic resource with a user identifier, the digital component distribution system 150 can obtain, if permitted by the user, user attribute data associated with a user profile identified by the user identifier. For example, the user profile can specify or indicate user interests, demographic attributes, and/or other characteristics of the user. The digital component distribution system 150 can identify such information from the user profile.

At 252, the digital component distribution system 150 sends a response to the client device 110. The response includes the selected digital components and attribute data specifying the user attributes of the user, e.g., the user attributes identified based on the output of the predictive model and/or the user attributes identified based on the user profile.

In response to receiving the attribute data, at 216, the client device 110 updates accumulated user attribute data stored in a shared storage of the client device 110 based on the user attributes specified by the attribute data.

In some implementations, when the user attributes have been identified using the predictive model based on the contextual data, the client device 110 can determine whether the accumulated user attribute data stored in the shared storage includes a keyed entry for an identified user attribute. If the accumulated user attribute data does not include the keyed entry, the client device 110 can generate a new keyed entry for the identified user attribute, and assign an entry value for the new keyed entry. On the other hand, if the accumulated user attribute data does include the keyed entry, the client device 110 can update a current entry value of the keyed entry based on the user attribute identified using the predictive model. For example, when updating the current entry value of the keyed entry, the client device 110 can increment or decrement the current entry value of the keyed entry.

In an illustrative example, a first digital component request received from the client device 110 can include contextual data that identifies a first electronic resource as "example.com//vegetablefertilizer/". The predictive model can output a prediction for a user accessing this webpage as being interested in gardening with a 60% likelihood. The client device 110 can generate a keyed entry of "Interest in gardening" and assign a value of 0.6 to the entry. A second digital component request received from the client device 110 can include contextual data that identifies a second electronic resource as "example.com/gardendesign/". The predictive model can output a prediction for a user accessing this webpage as being interested in gardening with an 80% likelihood. The client device 110 can update the value of keyed entry "Interest in gardening" by incrementing 0.8 to the value of the entry. The value of the keyed entry can be updated accumulatively based on the predicted user attributes related to the keyed entry.

In some other implementations, when the user attributes have been identified using the user profile data associated with the user identifier, the client device 110 can generate or update a keyed entry for one or more of the identified user attributes. For example, if the user profile data specifies or indicates that the user has an interest in gardening, the client device 110 can generate a keyed entry of "Interest in gardening" and assign a value of 1 to the entry. If the user profile data specifies or indicates that the user does not have an interest in gardening, the client device 110 can assign a value of 0 to the entry of "Interest in gardening".

In some implementations, when the electronic resource is being presented at the client device 110, a user interface for presenting the electronic resource includes a script code that causes an application of the client device 110 to update the accumulated user attribute data based on the user attributes identified using the user profile.

At 221, the secure aggregation and reporting system 120 obtains the accumulated user attribute data from the shared storage of the client device 110. The processes described above, including 212, 232, 214, 251*a*, 251*b*, 252, and 216, can be repeatedly performed for multiple client devices 110, and the secure aggregation and reporting system 120 obtains the accumulated user attribute data from each of the multiple client devices 110.

At 222, the secure aggregation and reporting system 120 generates an aggregated user attribute report that includes a respective aggregated data profiles for each of a set of selected aggregation keys using the obtained accumulated user attribute data.

The system 120 can select an aggregation key based on contextual signals such as particular resource locators, particular digital components, particular geographic regions, and/or particular types of devices. For example, an aggregation key can be in the form of <URL, Region, Device Type>. In another example, an aggregation key can be in the form of <Digital component identifier, Region, Device Type>. Other appropriate signals can also be used. Aggregation keys can include a combination of contextual signals, topics, and/or other appropriate signals. In a particular example, an aggregation key can be <example.com/flowers, Canada, smartphone>. The aggregated profile for this key would include data related to a subset of users that have visited example.com/flowers from smartphones located in Canada.

The system 120 can select the aggregation key from a list of candidate aggregation keys. The list of candidate aggregation keys can be configured by various entities, such as the digital component distribution system 150 and/or a publisher 130 of digital content. The digital component distribution system 150 and/or a publisher 130 can provide, to the system 120, configuration data that defines the list of candidate aggregation keys. The configuration data can also define, for each candidate aggregation key, the types of data to include in an aggregated profile for the aggregation key. For example, the configuration data can specify that the aggregated profile for a candidate aggregation key is to include, for each of multiple user attributes, a count of the number of users or a percentage of the users for which data is aggregated for the aggregation key that have that user attribute. Many combinations of data types can be included in an aggregated profile.

Once an aggregation key has been selected, the system 120 can identify the subset of client devices from which the accumulated user attributes will be used to generate the aggregated profile for the selected aggregation key. For example, the subset of client devices can be the client devices that have accessed the electronic resource or the digital component identified by the aggregation key. The selection of the subset of client devices can further be based on user permission settings. As noted above, for each client device, a user may be provided with controls (e.g., user interface elements with which a user can interact) allowing the user to make an election as to both if and when systems, programs, or features may enable the collection of user information and how such information is used.

In some implementations, before and/or during generating the aggregated profile using the accumulated user attribute data from the subset of client devices, the system 120 can apply privacy-preserving techniques to the accumulated user attribute data. These techniques can include anonymizing the data for each user, e.g., by removing any user identifiers from the data, applying k-anonymity techniques, and/or applying differential privacy techniques to the aggregated data.

For each selected aggregation key, the system 120 generates the aggregated profile by aggregating the accumulated user attribute data obtained from the identified subset of client devices. As noted above, an aggregated profile for an aggregation key can include various types of aggregated user data about users for which data is aggregated for the aggregation key. For example, the aggregated profile for an aggregation key can include a count of the number of users or a percentage of the users of the subset of client devices that have a particular attribute. In a particular example, the aggregated profile for the aggregation key <example.com/flowers, Canada, smartphone> can specify a percentage of the users of the identified subset of client devices that are female, a percentage of the users that have interests in the topic of gardening, and/or a percentage of the users that are English speakers.

In some implementations, the aggregated profile for an aggregation key can include a metric computed by the system 120. For example, the aggregated profile can include a reach metric that characterizes the total number of unique users in a set of users who have accessed a particular electronic resource, or the total number of unique users to whom a particular digital component has been provided. In another example, the aggregated profile can include a frequency metric that characterizes the number of times a same user has been provided with a particular digital component. In another example, the aggregated profile can include an attribution metric that quantifies, for the subset of client devices that have been provided a particular digital component, the number of digital component impressions that have led to a specific action (e.g., a conversion), such as a user interaction with the provided digital component, a user sign-up, a purchase, etc.

At 224a, the system 120 sends the aggregated user attribute report to the digital component distribution system 150. The system 120 can further send at least a portion the aggregated user attribute report to a publisher 130 or a website 140 (at 224b). For example, the system 120 can send the aggregated profile generated for a particular resource locator (e.g., a URL) to the corresponding website 140 or the publisher 130 of the resource.

At 254, the digital component distribution system 150 can use the aggregated data profiles in the report to adjust distribution parameters for distributing digital components.

In an illustrative example, for an aggregation key specifying a particular resource locator, e.g., example.com/flowers, the aggregated profile can include a percentage of users that belong to a particular interest group, e.g., a group with a topic of interest "gardening". The distribution system 150 can determine whether the percentage of users exceed a predefined value, and in case the percentage does exceed the predefined value, the distribution system 150 can add a related interest group to the list of groups for the particular digital component or a related digital component to be eligible for presentation.

In some other examples, the distribution system 150 can adjust the distribution parameters based on the metrics included in the aggregated profiles in the report. In an illustrative example, when an aggregated data profile includes a reach metric for a particular digital component in a particular geographic region, the distribution system 150 can determine whether the reach metric exceeds a predefined threshold, and if the reach metric exceeds the predefined threshold, the distribution system 150 can determine to remove the particular geographic region from the list of geographic regions for the particular digital component or a related digital component to be provided. In another illustrative example, when the reach metric for the particular digital component exceeds a certain threshold and/or a frequency metric for the particular digital exceeds a certain threshold for users in a particular interest group, the distribution system 150 can determine to add a related interest group to the list of groups for the particular digital component or a related digital component to be eligible for presentation. In another illustrative example, when the reach metric for a particular digital component exceeds a certain threshold and/or the frequency metric for the particular digital component exceeds a certain threshold, the distribution system 150 can determine to increase or decrease the selection parameter and/or budget for distributing the particular digital component or a related digital component.

At 256, the digital component distribution system 150 distributes digital components to the client devices 110 based on the distribution parameters. In particular, the distribution system 150 can select, according to the distribution parameters that have been adjusted at 254, digital components for distribution to client devices 110 in response to receiving digital component requests from the client devices. The system 150 can then provide the digital components selected according to the updated distribution parameters to the client devices 110. At 216, the client device 110 can then present the provided digital component, e.g., by an application of the client device 110.

Figure 3:
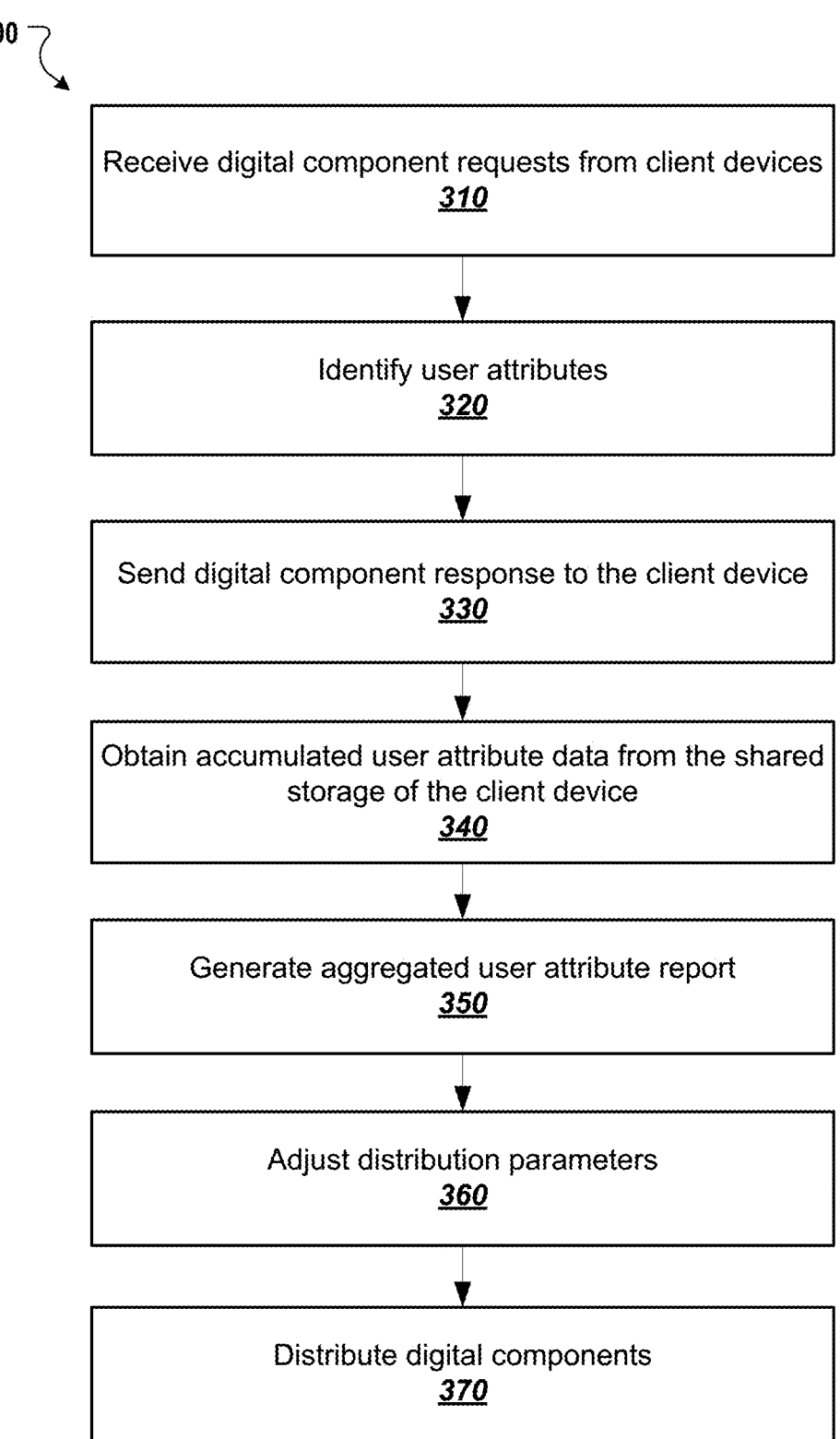
FIG. 3 is a flow diagram of an example process for distributing digital components for display at client devices.

FIG. 3 is a flow diagram of an example process 300 for distributing digital components for display at client devices. Operations of the process 300 can be performed by a system of one or more computers located in one or more locations, such as a server, e.g., the digital component distribution system 150 and/or the secure aggregation and reporting system 120 described with reference to FIG. 1, appropriately programmed in accordance with this specification, can perform the process 300. Operations of the process 300 can also be implemented as instructions stored on one or more computer-readable media, which may be non-transitory, and execution of the instructions by one or more data processing apparatus can cause the one or more data processing apparatus to perform the operations of the process 300. For convenience and without loss of generality, the process 300 will be described as being performed by a data processing apparatus, e.g., a computer system.

At 310, the data processing apparatus receives, for each of multiple client devices, a digital component request from an application running on the client device of a user. The digital component request can include contextual data related to an environment in which the digital components will be displayed at the client device. For example, the environment can include an electronic resource and the contextual data. The contextual data can include a resource locator (e.g., URL) for an electronic resource in which the one or more digital components will be displayed at the client device, and/or topics of content of the electronic resource.

At 320, the data processing apparatus identifies, for each client device, user attributes of the user based on the digital component request.

In some implementations, the user attributes are identified using a predictive model based on the contextual data in the digital component request. For example, the predictive model can be configured to predict attributes of users that have accessed the electronic resource or the topics of the contents of the electronic resource.

In some implementations, the user is subscribed to the electronic resource with a user identifier, and the user attributes are identified using a user profile associated with the user identifier.

At 330, the data processing apparatus sends, to the application of each client device, a digital component response. The digital component response includes (i) one or more digital components and (ii) attribute data specifying user attributes of the user. In response to receiving the attribute data, each client device is configured to update, based on the user attributes in the attribute data, accumulated user attribute data stored in a shared storage of the client device.

In some implementations, when the user attributes are identified using the predictive model based on the contextual data, the application can determine whether the accumulated user attribute data stored in the shared storage of the client device includes a keyed entry for the user attribute. If the accumulated user attribute data does not include the keyed entry, the application can generate a new keyed entry in the accumulated user attribute data, and assign an entry value for the new keyed entry based on the user attributes identified using the predictive model. If the accumulated user attribute data does include the keyed entry, the application can update the current entry value of the keyed entry in the accumulated user attribute data based on the user attributes identified using the predictive model. For example, to update the current entry value of the keyed entry, the application can increment or decrement the current entry value of the keyed entry.

In some implementations, when the user attributes are identified using the user profile associated with the user identifier, the application can determine whether the accumulated user attribute data stored in the shared storage of the client device includes a keyed entry for user attributes. If the aggregated user attribute data does not include the keyed entry, the application can generate a new keyed entry in the accumulated user attribute data, and assign an entry value for the new keyed entry based on the user attributes identified using the user profile. If the accumulated user attribute data does include the keyed entry, the application can update (e.g., replace) the entry value of the keyed entry in the accumulated user attribute data based on the user attributes identified using the user profile. In one example, a user interface of the electronic resource includes a script code to cause the application to update the accumulated user attribute data based on the user attributes in response to receiving the user attributes.

At 340, the data processing apparatus obtains the accumulated user attribute data from the shared storage of each client device.

At 350, the data processing apparatus generates an aggregated user attribute report for a set of aggregation keys using the obtained accumulated user attribute data. In particular, for each aggregation key, the data processing apparatus generates an aggregated data profile by aggregating the accumulated user attribute data from a subset of client devices that have accessed an electronic resource or a digital component identified by the aggregation key.

In some implementations, the aggregated profile for an aggregation key includes one or more metrics for the electronic resource or the digital component identified by the aggregation key. For example, the metrics can include a reach metric measuring the number of unique users in the subset of client devices that have accessed the electronic resource or the digital component identified by the aggregation key.

In some implementations, to improve data security and privacy, before and/or during generating the aggregated profile using the accumulated user attribute data from the subset of client devices, the data processing apparatus can apply privacy-preserving techniques to the accumulated user attribute data. These techniques can include anonymizing the data for each user, e.g., by removing any user identifiers from the data, applying k-anonymity techniques, and/or applying differential privacy techniques to the aggregated data. For example, to apply the differential privacy process, the data processing apparatus can add a random noise to the user attribute data of each of the subset of client devices before aggregating.

In some implementations, to improve data security and data privacy, the aggregated user attribute report can be generated by a secure aggregation system. The secure aggregation and reporting system can be a computing system separated from the digital component distribution system or a computing system that is a part of the digital component distribution system. If the secure aggregation and reporting system is a separate computing system from the digital component distribution system, the digital component distribution system can send an aggregation request to the secure aggregation and reporting system. The aggregation request includes the accumulated user attribute data received from each client device and the set of aggregation keys. The accumulated user attribute data received from a client device can be encrypted by the client device using an encryption key of the secure aggregation system. After the aggregated user attribute report has been generated by the secure aggregation and reporting system, the digital component distribution system can receive the aggregated data profiles from the secure aggregation system.

At 360, the data processing apparatus adjusts, based on the estimated metrics, one or more distribution parameters for distributing digital components to client devices in response to digital component requests. For example, the data processing apparatus can adjust, based on the estimated metrics, keywords that must be matched, a list of geographic locations that the digital component is eligible to be provided, a list of user groups to which the digital component is eligible to be provided, parameters characterizing resources with which the digital component is eligible to be presented, and/or other appropriate distribution parameters.

At 370, the data processing apparatus distributes the digital components to the client devices based on the distribution parameters.

Figure 4:
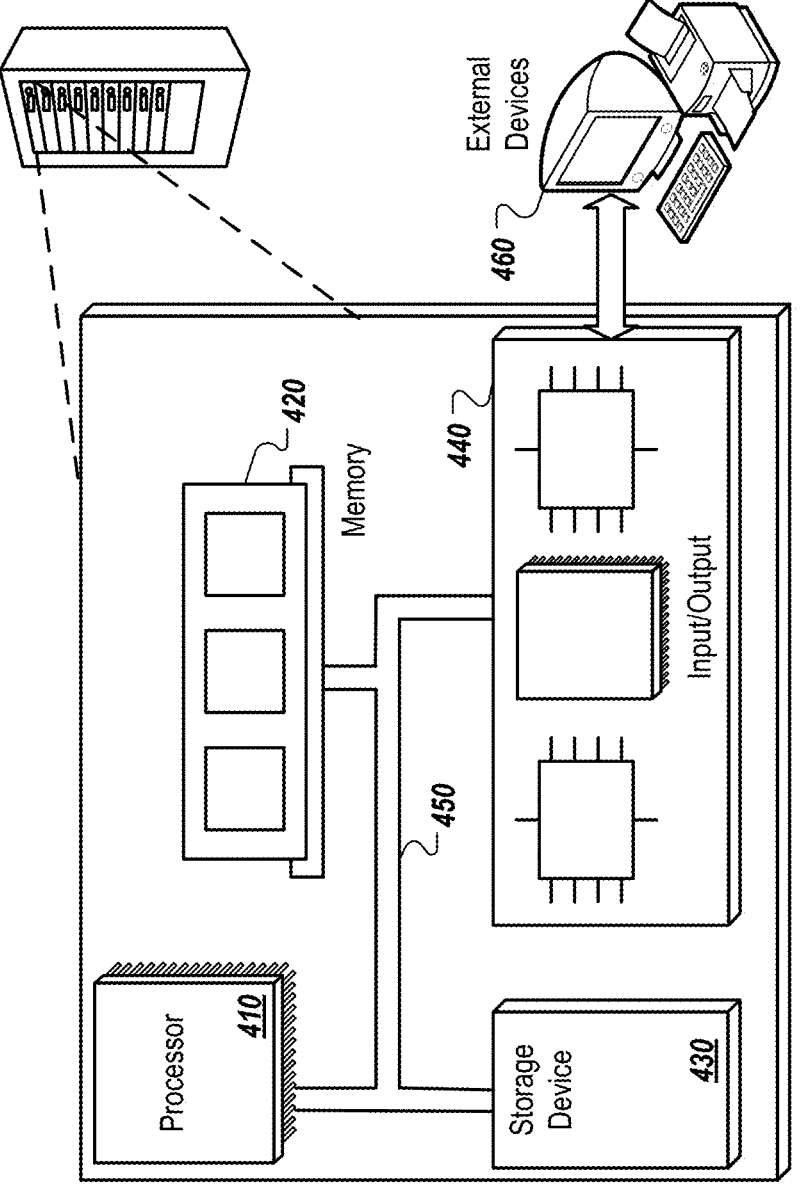
FIG. 4 is a block diagram of an example computer system.

FIG. 4 is a block diagram of an example computer system 400 that can be used to perform the operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large-capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to external devices 460, e.g., keyboard, printer, and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method, comprising:
for each of a plurality of client devices, receiving, from an application running on the client device of a user and by a digital component distribution system, a digital component request;

identifying, by the digital component distribution system and based on the digital component request, one or more user attributes of the user; and sending, by the digital component distribution system and to the application, a digital component response in response to the digital component request, the digital component response comprising (i) one or more digital components and (ii) attribute data comprising the one or more user attributes of the user, wherein the application is configured to update, based on the one or more user attributes, accumulated user attribute data stored in a shared storage of the client device in response to receiving the attribute data;

obtaining, by the digital component distribution system and from the shared storage of each of the plurality of client devices, the accumulated user attribute data stored in the shared storage of each client device;

generating, by the digital component distribution system, an aggregated user attribute report for one or more aggregation keys using the obtained accumulated user attribute data, comprising, for each of the one or more aggregation keys, obtaining an aggregated data profile that is generated by aggregating the accumulated user attribute data from a subset of the plurality of client devices that have accessed an electronic resource or a digital component identified by the aggregation key, wherein each aggregation key specifies a combination of contextual signals that defines a cohort of users for which user attribute data is aggregated;

adjusting, by the digital component distribution system and based on the aggregated data profiles, one or more distribution parameters for distributing digital components to client devices in response to digital component requests; and distributing, by the digital component distribution system, digital components to the client devices based on the distribution parameters.

2. The method of claim 1, wherein generating the aggregated user attribute report comprises:

sending, to a secure aggregation system, an aggregation request comprising the accumulated user attribute data obtained from each of the plurality of client devices and the one or more aggregation keys; and receiving, from the secure aggregation system, the aggregated data profile generated in response to the aggregation request.

3. The method of claim 2, wherein the accumulated user attribute data received from each client device is encrypted by the client device using an encryption key of the secure aggregation system.

4. The method of claim 1, wherein the digital component request comprises contextual data related to an environment in which the one or more digital components will be displayed at the client device.

5. The method of claim 4, wherein the environment includes an electronic resource and the contextual data comprises one or more of: a resource locator for an electronic resource in which the one or more digital components will be displayed at the client device, or topics of content of the electronic resource.

6. The method of claim 1, wherein the one or more user attributes are identified using a predictive model configured to predict attributes of users that have accessed the electronic resource or topics of contents of the electronic resource.

7. The method of claim 6, wherein the application is configured to, in response to receiving the user attributes identified using the predictive model:

determine whether the accumulated user attribute data stored in the shared storage of the client device includes a keyed entry for the one or more user attributes;

in response to the accumulated user attribute data not including the keyed entry, generate a new keyed entry in the accumulated user attribute data, and assign an entry value for the new keyed entry based on the one or more user attributes identified using the predictive model; and in response to the accumulated user attribute data including the keyed entry, update a current entry value of the keyed entry in the accumulated user attribute data based on the one or more user attributes identified using the predictive model.

8. The method of claim 7, wherein updating the current entry value of the keyed entry comprises:

in response to the accumulated user attribute data including the keyed entry, incrementing or decrementing the current entry value of the keyed entry.

9. The method of claim 1, wherein the user is subscribed to the electronic resource with a user identifier, and the one or more user attributes are identified using a user profile associated with the user identifier.

10. The method of claim 9, wherein the application is configured to, in response to receiving the user attributes identified using the user profile:

determine whether the accumulated user attribute data stored in the shared storage of the client device includes a keyed entry for the one or more user attributes;

in response to the aggregated user attribute data not including the keyed entry, generate a new keyed entry in the accumulated user attribute data, and assign an entry value for the new keyed entry based on the one or more user attributes identified using the user profile; and in response to the accumulated user attribute data including the keyed entry, update the entry value of the keyed entry in the accumulated user attribute data based on the one or more user attributes identified using the user profile.

11. The method of claim 10, wherein a user interface of the electronic resource comprises a code to cause the application to update the accumulated user attribute data based on the one or more user attributes in response to receiving the user attributes.

12. The method of claim 1, wherein the aggregated data profile for an aggregation key includes one or more metrics for the electronic resource or the digital component identified by the aggregation key.

13. The method of claim 12, wherein the one or more metrics include a reach metric measuring a number of unique users in the subset of client devices that have accessed the electronic resource or the digital component identified by the aggregation key.

14. The method of claim 1, wherein aggregating the user attribute data from the subset of client devices comprises adding a random noise to the user attribute data of each of the subset of client devices before aggregating.

15. A digital component distribution system comprising:

one or more computers; and one or more storage devices storing instructions that when executed by the one or more computers, cause the one or more computers to perform operations comprising:

for each of a plurality of client devices, receiving, from an application running on the client device of a user, a digital component request;

identifying, based on the digital component request, one or more user attributes of the user; and sending, to the application, a digital component response comprising (i) one or more digital components and (ii) attribute data comprising the one or more user attributes of the user, wherein the application is configured to update, based on the one or more user attributes, accumulated user attribute data stored in a shared storage of the client device in response to receiving the attribute data;

obtaining, from the shared storage of each of the plurality of client devices, the accumulated user attribute data stored in the shared storage of each client device;

generating an aggregated user attribute report for one or more aggregation keys using the obtained accumulated user attribute data, comprising, for each of the one or more aggregation keys, obtaining an aggregated data profile that is generated by aggregating the accumulated user attribute data from a subset of the plurality of client devices that have accessed an electronic resource or a digital component identified by the aggregation key, wherein each aggregation key specifies a combination of contextual signals that defines a cohort of users for which user attribute data is aggregated;

adjusting, based on the aggregated data profiles, one or more distribution parameters for distributing digital components to client devices in response to digital component requests; and distributing digital components to the client devices based on the distribution parameters.

16. One or more non-transitory computer-readable storage media storing instructions that, when executed by one or more computers of a digital component distribution system, cause the one or more computers to perform operations comprising:

for each of a plurality of client devices, receiving, from an application running on the client device of a user, a digital component request;

identifying, based on the digital component request, one or more user attributes of the user; and sending, to the application, a digital component response comprising (i) one or more digital components and (ii) attribute data comprising the one or more user attributes of the user, wherein the application is configured to update, based on the one or more user attributes, accumulated user attribute data stored in a shared storage of the client device in response to receiving the attribute data;

obtaining, from the shared storage of each of the plurality of client devices, the accumulated user attribute data stored in the shared storage of each client device;

generating an aggregated user attribute report for one or more aggregation keys using the obtained accumulated user attribute data, comprising, for each of the one or more aggregation keys, obtaining an aggregated data profile that is generated by aggregating the accumulated user attribute data from a subset of the plurality of client devices that have accessed an electronic resource or a digital component identified by the aggregation key, wherein each aggregation key specifies a combination of contextual signals that defines a cohort of users for which user attribute data is aggregated;

adjusting, based on the aggregated data profiles, one or more distribution parameters for distributing digital components to client devices in response to digital component requests; and distributing digital components to the client devices based on the distribution parameters.

17. The digital component distribution system of claim 15, wherein generating the aggregated user attribute report comprises:

sending, to a secure aggregation system, an aggregation request comprising the accumulated user attribute data obtained from each of the plurality of client devices and the one or more aggregation keys; and receiving, from the secure aggregation system, the aggregated data profile generated in response to the aggregation request.

18. The digital component distribution system of claim 17, wherein the accumulated user attribute data received from each client device is encrypted by the client device using an encryption key of the secure aggregation system.

19. The one or more non-transitory computer-readable storage media of claim 16, wherein the one or more user attributes are identified using a predictive model configured to predict attributes of users that have accessed the electronic resource or topics of contents of the electronic resource.

20. The one or more non-transitory computer-readable storage media of claim 19, wherein the application is configured to, in response to receiving the user attributes identified using the predictive model:

determine whether the accumulated user attribute data stored in the shared storage of the client device includes a keyed entry for the one or more user attributes;

in response to the accumulated user attribute data not including the keyed entry, generate a new keyed entry in the accumulated user attribute data, and assign an entry value for the new keyed entry based on the one or more user attributes identified using the predictive model; and in response to the accumulated user attribute data including the keyed entry, update a current entry value of the keyed entry in the accumulated user attribute data based on the one or more user attributes identified using the predictive model.

* * * * *